F. H. WAY,

Assignor, by mesne Assignments, to J. SUES and S. W. RAPLEE.

Children's Carriages.

No. 8,583. Reissued Feb. 18, 1879.

*Witnesses:*
Carl Karp
Th. Mayer

*Inventor:*
F. H. Way
by Paul Goepel
Attorney.

N. PETERS, PHOTO-LITHOGRAPHER, WASHINGTON, D. C.

UNITED STATES PATENT OFFICE.

FREDERICK H. WAY, OF BROOKLYN, NEW YORK, ASSIGNOR, BY MESNE ASSIGNMENTS, TO JULIUS SUES AND SYLVESTER W. RAPLEE.

IMPROVEMENT IN CHILDREN'S CARRIAGES.

Specification forming part of Letters Patent No. 133,130, dated November 19, 1872; Reissue No. 8,583, dated February 18, 1879; application filed December 2, 1878.

*To all whom it may concern:*

Be it known that I, FREDERICK H. WAY, of Brooklyn, county of Kings, and State of New York, have invented certain Improvements in Children's Carriages, of which the following is a specification, reference being had to the accompanying drawings, in which—

Figure 1:
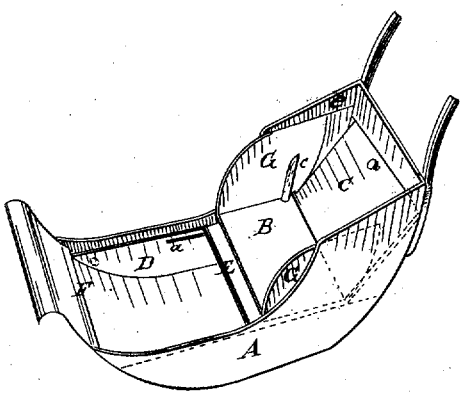
Figure 2:
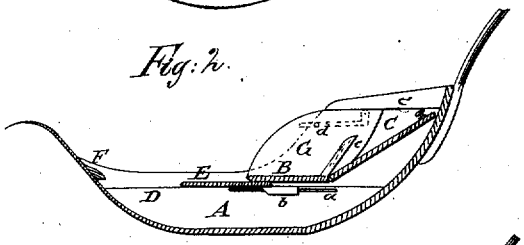
Figure 3:
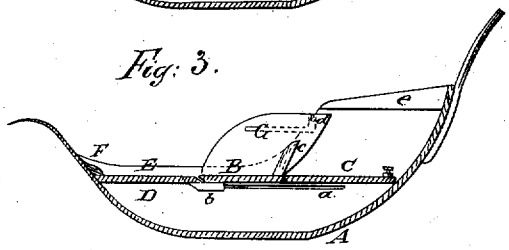

Figure 1 is a perspective view of the body of a child's carriage having my improvement attached thereto. Fig. 2 is a vertical longitudinal section of the same, with the seat and back in their normal position, nearly. Fig. 3 is also a vertical longitudinal section, with the seat and back extended, and forming, with the addition of a third piece, the support for a bed, or, when properly upholstered, a couch.

Similar letters of reference indicate corresponding parts.

My invention relates to such improvements in children's carriages that the seat of the carriage may be made convertible from an upright to a reclining or horizontal position entirely within the lines of the body of the carriage; and the invention consists of a novel construction of the seat, with a hinged or drop back, that may be converted, with the seat and an auxiliary slide-piece, into a bed, as desired, in connection with guiding, locking, and adjusting devices, as will more fully appear hereinafter.

Referring to the drawings, A represents the body of a child's carriage; B, the seat, and C the back. The seat B is made movable on side guideways, D D, of the body A, and the back C either pivoted to the side pieces, G G, of the seat B, or hinged directly to the seat. Under this seat is a removable piece, E, which, for economy of room, is made to slide under the seat in the manner of a drawer, being guided by ears *b* in slots *a* of the side guideways, D D, or sides of the carriage, and thus prevented from being withdrawn therefrom. This is the most desirable way of operating the auxiliary piece E, although it may be hinged to the seat and swung out to a horizontal position when required. All these parts move together on the side guideways, D D, the travel of the movable seat B being arrested when it arrives at its foremost position by slots in the outside of the fixed side pieces, G G, and stop-pins *d d* on the sides of the carriage, as shown in dotted lines in Figs. 2 and 3. The side pieces, G G, are provided at the inside with projecting stops or ribs *c*, against which the hinged back is pressed when the same is in upright, or nearly upright, position. The upper edges of the side pieces, G G, are guided by side rails, *e*, of the carriage-body, the side pieces forming, when moved forward with the seat, prolongations of the sides of the carriage-body, which prevent the falling out of the child from the carriage when the seat has been changed into a bed. The auxiliary slide-piece E, and the seat B, are beveled at their meeting edges, so that when the former is drawn out a sudden fall of the seat B is obviated, the beveled edges admitting, furthermore, the convenient return of the auxiliary piece under the seat.

On the dash-board of the carriage is a projecting horizontal rail, F, which receives the edge of the piece E under it, and thereby serves to hold it firmly on the guideways D D.

The parts being thus constructed and arranged, the mode of effecting the alteration will be as follows: The seat, along with the drop-back C and auxiliary piece E, is held in locked position by a suitable device, such as a pin through the side piece, G, and side of the carriage-body. This locking or fastening device is released when the seat is to be converted into a bed or couch. The seat is then moved forward, the hinged back dropping by its own gravity, the descent being made gradual by the curved or inclined shape of the rear portion of the body. When the seat arrives at its foremost position, the drop-back assumes a horizontal position on the guideways. The auxiliary slide-piece is now drawn forward from under the seat B until it is placed below the locking-rail F. The seat, having lost its support, drops on the side guides, D D, and is then flush or even with the back C and the auxiliary piece E, forming therewith a horizontal couch or support for a bed.

From the foregoing it will be obvious that the carriage-seat can be converted from a sitting to a recumbent or reclining position while the child is in it without awakening it. The noise and motion of the carriage lull the child to sleep, and when asleep the seat is readily converted into a bed without disturbing the child, at a great convenience to the mother or servant.

I am aware that children's carriages have been constructed heretofore in which the accomplishment of the same object—viz., the change of the carriage-body from a seat to a bed-support or couch—was aimed at, this object having been accomplished by various means, which I do not claim to cover, broadly.

Having thus described my invention, I claim as new and desire to secure by Letters Patent—

1. A carriage-body having a sliding seat with a drop-back that is capable of adjustment within the body of the carriage, substantially as described.

2. A carriage-body provided with a sliding seat, having a hinged back, said back being adjustable into upright or horizontal position within the body of the carriage, substantially as set forth.

3. The combination of a carriage-body having side guideways with a movable seat having a drop-back, and with a locking device, as specified.

4. The combination of a carriage-body having side guideways with a movable seat, and with an auxiliary slide-piece, that may be placed below the seat or drawn out to form an extension therewith, substantially as set forth.

5. The combination of a carriage-body having side guideways, and of a movable seat having an adjustable back and fixed side guard-pieces, as specified.

6. The combination, with a carriage-body having side guideways, of a movable seat having hinged back and fixed side pieces, the side pieces being guided along and locked to the body of the carriage by suitable devices, substantially as described.

7. The combination of a carriage-body with a guided and movable seat having a hinged back, and with an auxiliary slide-piece or extension, by which, in connection with the back, the carriage may be converted from a seat to a couch, as described.

8. The combination of the carriage-body A, movable seat B, drop-back C, and fixed side pieces, G, having projections or stops *c*, to prevent the back from falling forward, as set forth.

9. The combination of a carriage-body, A, having side guideways, D, movable seat B, and auxiliary slide-piece E, with a fixed front rail, F, of the carriage-body, to lock the slide-piece when arranged on a level with the seat, substantially as specified.

10. The combination of carriage-body A, having side guideways, D, and front rail, F, with the movable seat B, having beveled front edge, and with an auxiliary slide-piece, E, having beveled rear edge, to facilitate drawing out and returning of slide-piece, substantially as described.

11. The combination of a carriage-body having side guideways with a movable seat, and an auxiliary slide-piece that is guided by pins or ears in slots of the guideways, so that it may be easily drawn out to a level with the seat, or stored away below the same, substantially as and for the purpose set forth.

In testimony of the foregoing I have signed this specification this 12th day of November, 1878.

F. H. WAY.

Witnesses:
JULIUS SUES,
J. G. JENKINS.